(12) United States Patent
Singh et al.

(10) Patent No.: US 12,339,865 B2
(45) Date of Patent: Jun. 24, 2025

(54) SYSTEM AND METHOD FOR IMPLEMENTING A REGULATORY AND STATUTORY REPORTING GENERIC MULTI-DISCLOSURE PROCESSOR

(71) Applicant: JPMorgan Chase Bank, N.A., New York, NY (US)

(72) Inventors: Atul Singh, Navi Mumbai (IN); Bala Manivannan, Irving, TX (US); Seetha Gurunathan, Bangalore (IN); Imran Hussain, Mumbai (IN); Ruchi Rao, Bengaluru (IN); David Puricelli, II, Medway, MA (US); Shalini Goyal, New Delhi (IN); Aniruddha Ramekar, Mumbai (IN); Anduela Kelmendi, Revere, MA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/241,472

(22) Filed: Sep. 1, 2023

(65) Prior Publication Data
US 2025/0028731 A1    Jan. 23, 2025

(30) Foreign Application Priority Data
Jul. 19, 2023  (IN) .............................. 202311048462

(51) Int. Cl.
*G06F 16/25* (2019.01)
*G06F 9/451* (2018.01)

(52) U.S. Cl.
CPC ............ *G06F 16/254* (2019.01); *G06F 9/451* (2018.02)

(58) Field of Classification Search
CPC ...... G06F 16/13; G06F 16/168; G06F 16/185; G06F 16/254; G06F 9/451
See application file for complete search history.

(56) References Cited

U.S. PATENT DOCUMENTS

| 10,997,195 | B1 * | 5/2021 | Sekar | G06N 20/00 |
| 11,269,911 | B1 * | 3/2022 | Jones | G06F 16/254 |

(Continued)

FOREIGN PATENT DOCUMENTS

| CN | 111082976 A | * | 4/2020 | ......... H04L 41/0253 |

*Primary Examiner* — James E Richardson
(74) *Attorney, Agent, or Firm* — GREENBLUM & BERNSTEIN, P.L.C.

(57) ABSTRACT

Various methods and processes, apparatuses/systems, and media for processing of multiple files having different formats and structures are disclosed. The method includes identifying a plurality of data files each having a predefined file format and structure and viewing corresponding file status. The plurality of data files being received from various data sources. The method implements a generic single ETL processor for front loading of ETL in a manner such that user input is received to configure the plurality of files and transmit to multiple downstream systems for further processing via UI mapping. Data file configuration screen can be used to search list of files configured under any report masters along with its status. This configuration screen can be also used to configure new external source files or edit an existing one thereby providing, among others, user controlled data loads, reducing tech dependency, providing reusability and scalability, and eliminating manual overrides.

17 Claims, 6 Drawing Sheets

(56) References Cited

U.S. PATENT DOCUMENTS

| | | | |
|---|---|---|---|
| 2011/0295795 A1* | 12/2011 | Venkatasubramanian | ................... G06F 16/254 707/602 |
| 2017/0185661 A1* | 6/2017 | Belyy | ................... G06F 16/254 |
| 2017/0220654 A1* | 8/2017 | De | ................... G06F 16/254 |
| 2018/0210931 A1* | 7/2018 | Karuppiah | ............ G06F 16/254 |
| 2020/0004837 A1* | 1/2020 | Mohan | ................... G06F 16/122 |
| 2022/0129474 A1* | 4/2022 | Maduri | ................. G06F 16/287 |
| 2022/0405294 A1* | 12/2022 | Padbidri | ............... G06F 16/254 |

\* cited by examiner

SYSTEM AND METHOD FOR IMPLEMENTING A REGULATORY AND STATUTORY REPORTING GENERIC MULTI-DISCLOSURE PROCESSOR

CROSS-REFERENCE TO RELATED APPLICATIONS

This application claims the benefit of priority from Indian Patent Application No. 202311048462, filed Jul. 19, 2023, which is herein incorporated by reference in its entirety.

TECHNICAL FIELD

This disclosure generally relates to data processing, and, more particularly, to methods and apparatuses for implementing a platform, language, cloud, and database agnostic data processing module configured to implement a generic single ETL (Extract-Transform-Load) processor for consuming data points from any file as configured without any additional tech development.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to data processing, data migration, monitoring, performance analysis, project tracking, data management, and competitive analysis, to name but a few. In general, large enterprises, corporations, agencies, institutions, and other organizations are facing a continuing problem of handling, processing, and/or accurately describing a vast amount of data having various file formats received from various sources that are crucial to plan actions at store level or market/regional level in an efficient and expedited manner. In enterprises today, data may be consumed, stored, and distributed by various programs. Important decisions may be made based on those data elements. However, often key stakeholders are not sure how the data has been harnessed. Although conventional tools may allow enterprise metadata management, those tools often are costly and results in vendor tie in, fail to adequately address the issues surrounding consuming data across any file.

For example, financial (statutory/regulatory) reporting process often receives a large number of files (approximately 500 different files, but the disclosure is not limited thereto) in different formats and structures from multiple sources, such as, clients or internal upstream team or third party vendors to prepare working papers in order to be aligned to end disclosures. These feeds are in primarily xls/csv/txt or PDF format with non-homogenous composition and structure.

Conventional approach of data consumption may include building one ETL per file, i.e., 500 ETLs for equivalent 500 unique data feeds. Usually, one ETL build may take 3-5 days of build effort, and additionally, any change in the incoming feed format may require a team of technology experts (Tech team) to spend hours of manual effort to update it. For example, users prepare workings manually and load them into respective financial reporting writer. This involves huge manual effort along with inherent operation and technical risks resulting in delay/performance issues. Additionally, during each cycle, file structure/format may get changed due to changes in file received from clients or any other upstream systems due to restructuring of attributes resulting in revisiting of file structure.

Thus, conventional approach may prove to be extremely time consuming and not a viable solution to adequately address the issues surrounding consuming data across any file.

SUMMARY

The present disclosure, through one or more of its various aspects, embodiments, and/or specific features or sub-components, provides, among other features, various systems, servers, devices, methods, media, programs, and platforms for implementing a platform, language, cloud, and database agnostic data processing module configured to implement a generic single ETL processor for configuring and loading multiple files having different formats and structures which can be extended to unlimited files without any development effort required by a Tech team, but the disclosure is not limited thereto.

For example, the present disclosure, through one or more of its various aspects, embodiments, and/or specific features or sub-components, also provides, among other features, various systems, servers, devices, methods, media, programs, and platforms for implementing a platform, language, cloud, and database agnostic data processing module configured to implement a generic single ETL processor for front loading of ETL, i.e., providing flexibility to users to configure multiple files and transmit to multiple down streams for further processing via User Interface (UI) mapping; provisioning system to configure new files, restructure old files without any development changes, etc., thereby providing user controlled data loads, reducing tech dependency, providing reusability and scalability, eliminating manual overrides, but the disclosure is not limited thereto.

According to exemplary embodiments, a method for processing of multiple files having different formats and structures by utilizing one or more processors and one or more memories is disclosed. The method may include: identifying a plurality of data files each having a predefined file format and structure and viewing corresponding file status, the plurality of data files being received from various data sources; implementing a generic single ETL processor for front loading of ETL in a manner such that user input is received to configure the plurality of files and transmit to multiple downstream systems for further processing via UI mapping; implementing a UI platform that includes a configuration UI layer and an upload UI layer; receiving user input, via the configuration UI layer, to configure the files and corresponding fields that are to be generated in the multiple downstream systems; receiving approval for the files that has been configured; uploading, in response to receiving approval, the files via the upload UI layer; monitoring the uploaded files; determining that an uploaded file is valid based on matching corresponding configuration details and file rules received from the generic single ETL processor; transmitting the valid file to a corresponding downstream system based on received corresponding output configuration and outbound rules; and outputting a final publication by the downstream system based on receiving the valid file.

According to exemplary embodiments, the method may further include: receiving user input to configure the corresponding fields available in the files to consume in a host platform; and redirecting the files to any field available in the downstream system based on user selection.

According to exemplary embodiments, the method may further include: implementing the generic single ETL processor for the front loading of ETL in a manner such that components of the single generic ETL processor along with front loading approach can be plugged in any application having similar business requirements.

According to exemplary embodiments, in implementing the front loading approach, the method may further include: receiving user input via the configuration UI layer to define: a predefined file format of each of said plurality of data files; standard nomenclature; and attributes.

According to exemplary embodiments, wherein the predefined file format may include one or more of the following file formats: .pdf, .doc, .csv, .xls, and .xlsx, but the disclosure is not limited thereto.

According to exemplary embodiments, wherein, in a case where the file format may be .xls, the attributes may include indication as to where to start reading, and wherein, in a case where the file format may be .doc, the attributes may include indication of what type of delimiter is utilized.

According to exemplary embodiments, wherein each of said plurality of data files may belong to a particular reporting master, wherein the reporting master may be a logical grouping of all similar data files having same end usage as a part of financial statements, and wherein the reporting master may be client and financial institution agnostic.

According to exemplary embodiments, a system for processing of multiple files having different formats and structures is disclosed. The system may include: a processor; and a memory operatively connected to the processor via a communication interface, the memory storing computer readable instructions, when executed, may cause the processor to: identify a plurality of data files each having a predefined file format and structure and view corresponding file status, the plurality of data files being received from various data sources; implement a generic single ETL processor for front loading of ETL in a manner such that user input is received to configure the plurality of files and transmit to multiple downstream systems for further processing via UI mapping; implement a user UI platform that includes a configuration UI layer and an upload UI layer; receive user input, via the configuration UI layer, to configure the files and corresponding fields that are to be generated in the multiple downstream systems; receive approval for the files that has been configured; upload, in response to receiving approval, the files via the upload UI layer; monitor the uploaded files; determine that an uploaded file is valid based on matching corresponding configuration details and file rules received from the generic single ETL processor; transmit the valid file to a corresponding downstream system based on received corresponding output configuration and outbound rules; and output a final publication by the downstream system based on receiving the valid file.

According to exemplary embodiments, the processor may be further configured to: receive user input to configure the corresponding fields available in the files to consume in a host platform; and redirect the files to any field available in the downstream system based on user selection.

According to exemplary embodiments, the processor may be further configured to: implement the generic single ETL processor for the front loading of ETL in a manner such that components of the single generic ETL processor along with front loading approach can be plugged in any application having similar business requirements.

According to exemplary embodiments, in implementing the front loading approach, the processor may be further configured to: receive user input via the configuration UI layer to define: a predefined file format of each of said plurality of data files; standard nomenclature; and attributes.

According to exemplary embodiments, a non-transitory computer readable medium configured to store instructions for processing of multiple files having different formats and structures is disclosed. The instructions, when executed may cause a processor to perform the following: identifying a plurality of data files each having a predefined file format and structure and viewing corresponding file status, the plurality of data files being received from various data sources; implementing a generic single ETL processor for front loading of ETL in a manner such that user input is received to configure the plurality of files and transmit to multiple downstream systems for further processing via UI mapping; implementing a UI platform that includes a configuration UI layer and an upload UI layer; receiving user input, via the configuration UI layer, to configure the files and corresponding fields that are to be generated in the multiple downstream systems; receiving approval for the files that has been configured; uploading, in response to receiving approval, the files via the upload UI layer; monitoring the uploaded files; determining that an uploaded file is valid based on matching corresponding configuration details and file rules received from the generic single ETL processor; transmitting the valid file to a corresponding downstream system based on received corresponding output configuration and outbound rules; and outputting a final publication by the downstream system based on receiving the valid file.

According to exemplary embodiments, the instructions, when executed, may cause the processor to further perform the following: receiving user input to configure the corresponding fields available in the files to consume in a host platform; and redirecting the files to any field available in the downstream system based on user selection.

According to exemplary embodiments, the instructions, when executed, may cause the processor to further perform the following: implementing the generic single ETL processor for the front loading of ETL in a manner such that components of the single generic ETL processor along with front loading approach can be plugged in any application having similar business requirements.

According to exemplary embodiments, in implementing the front loading approach, the instructions, when executed, may cause the processor to further perform the following: receiving user input via the configuration UI layer to define: a predefined file format of each of said plurality of data files; standard nomenclature; and attributes.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
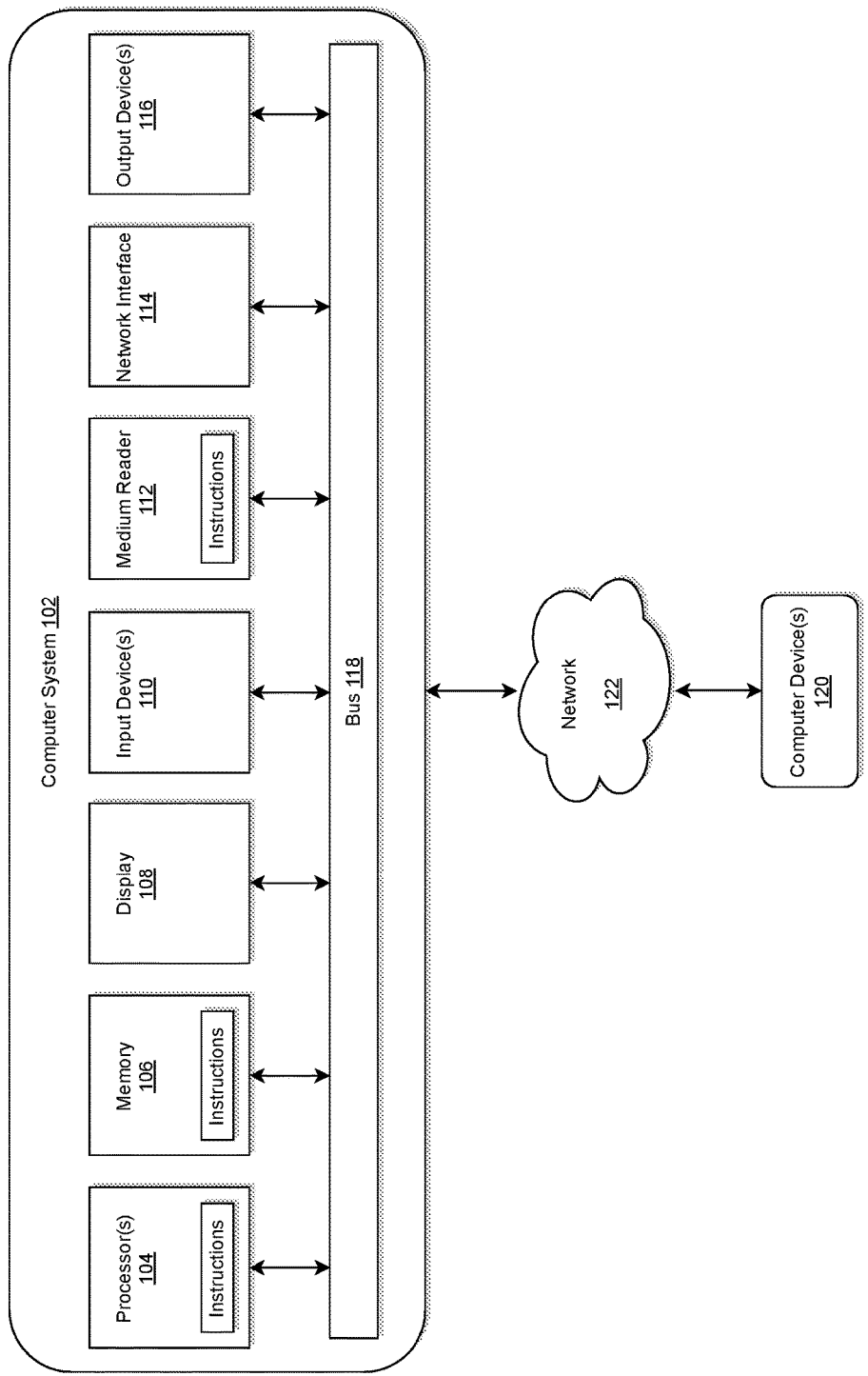
FIG. 1 illustrates a computer system for implementing a platform, language, database, and cloud agnostic data processing module for implementing a generic single ETL processor for configuring and loading multiple files having different formats and structures in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform, language, database, and cloud agnostic data processing module for implementing a generic single ETL processor for configuring and loading multiple files having different formats and structures in accordance with an exemplary embodiment. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the data processing module may be platform, language, database, and cloud agnostic that may allow for consistent easy orchestration and passing of data through various components to output a desired result regardless of platform, browser, language, database, and cloud environment. Since the disclosed process, according to exemplary embodiments, is platform, language, database, browser, and cloud agnostic, the data processing module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
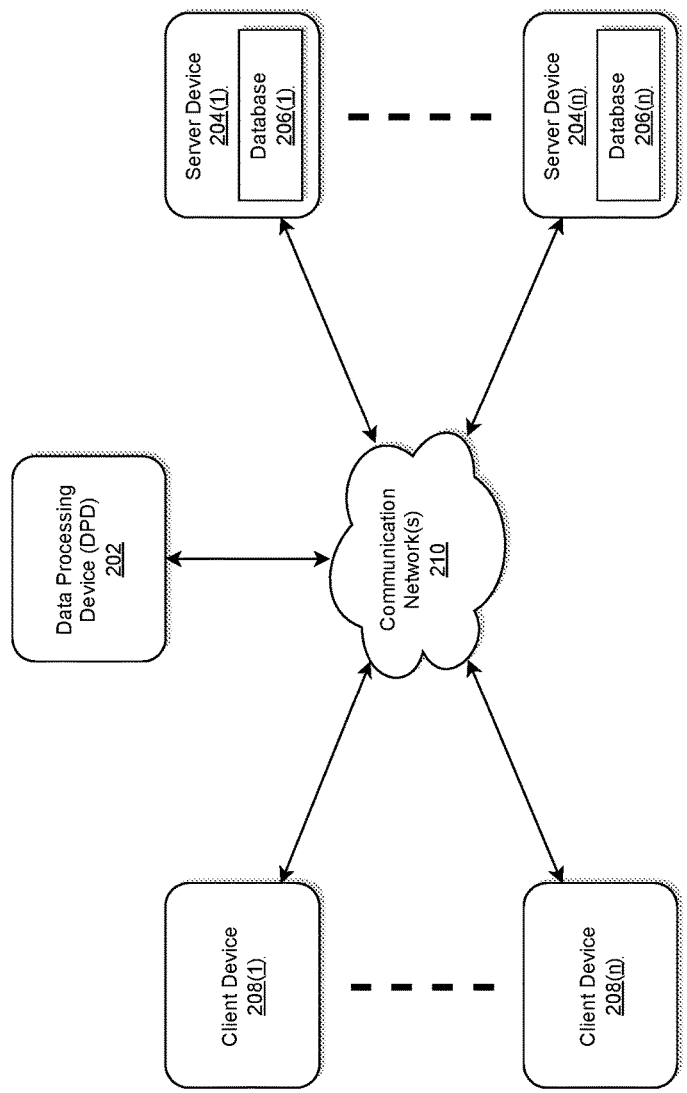
FIG. 2 illustrates an exemplary diagram of a network environment with a platform, language, database, and cloud agnostic data processing device in accordance with an exemplary embodiment.

Referring to FIG. 2, a schematic of an exemplary network environment 200 for implementing a language, platform, database, and cloud agnostic data processing device (DPD) of the instant disclosure is illustrated.

According to exemplary embodiments, the above-described problems associated with conventional tools may be overcome by implementing a DPD 202 as illustrated in FIG. 2 that may be configured for implementing a platform, language, database, and cloud agnostic data processing module for implementing a generic single ETL processor for configuring and loading multiple files having different formats and structures, but the disclosure is not limited thereto. For example, according to exemplary embodiments, the above-described problems associated with conventional tools may be overcome by implementing a DPD 202 as illustrated in FIG. 2 that may be configured for implementing a platform, language, database, and cloud agnostic data processing module for implementing a generic single ETL processor for front loading of ETL, i.e., providing flexibility to users to configure multiple files and transmit to multiple down streams for further processing via UI mapping; provisioning system to configure new files, restructure old files without any development changes, etc., thereby providing user controlled data loads, reducing tech dependency, providing reusability and scalability, eliminating manual overrides, but the disclosure is not limited thereto.

The DPD 202 may have one or more computer system 102s, as described with respect to FIG. 1, which in aggregate provide the necessary functions.

The DPD 202 may store one or more applications that can include executable instructions that, when executed by the DPD 202, cause the DPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPD 202 itself, may be located in virtual server(s) running in a cloud-based computing environment rather than being tied to one or more specific physical network computing devices. Also, the application(s) may be running in one or more virtual machines (VMs) executing on the DPD 202. Additionally, in one or more embodiments of this technology, virtual machine(s) running on the DPD 202 may be managed or supervised by a hypervisor.

In the network environment 200 of FIG. 2, the DPD 202 is coupled to a plurality of server devices 204(1)-204(n) that hosts a plurality of databases 206(1)-206(n), and also to a plurality of client devices 208(1)-208(n) via communication network(s) 210. A communication interface of the DPD 202, such as the network interface 114 of the computer system 102 of FIG. 1, operatively couples and communicates between the DPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPD 202 may be a standalone device or integrated with one or more other devices or apparatuses, such as one or more of the server devices 204(1)-204(n), for example. In one particular example, the DPD 202 may be hosted by one of the server devices 204(1)-204(n), and other arrangements are also possible. Moreover, one or more of the devices of the DPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DPD 202 that may efficiently provide a platform for implementing a platform, language, database, and cloud agnostic data processing module for implementing a generic single ETL processor for configuring and loading multiple files having different formats and structures, but the disclosure is not limited thereto. For example, according to exemplary embodiments, the client devices 208(1)-208(n) in this example may include any type of computing device that can facilitate the implementation of the DPD 202 that may efficiently provide a platform for implementing a platform, language, database, and cloud agnostic data processing module for implementing a generic single ETL processor for front loading of ETL, i.e., providing flexibility to users to configure multiple files and transmit to multiple down streams for further processing via UI mapping; provisioning system to configure new files, restructure old files without any development changes, etc., thereby providing user controlled data loads, reducing tech dependency, providing reusability and scalability, eliminating manual overrides, but the disclosure is not limited thereto.

The client devices 208(1)-208(n) may run interface applications, such as standard web browsers or standalone client applications, which may provide an interface to communicate with the DPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as may be appreciated by those skilled in the relevant art(s).

One or more of the devices depicted in the network environment 200, such as the DPD 202, the server devices 204(1)-204(n), or the client devices 208(1)-208(n), for example, may be configured to operate as virtual instances on the same physical machine. For example, one or more of the DPD 202, the server devices 204(1)-204(n), or the client devices 208(1)-208(n) may operate on the same physical device rather than as separate devices communicating through communication network(s) 210. Additionally, there may be more or fewer DPDs 202, server devices 204(1)-204(n), or client devices 208(1)-208(n) than illustrated in FIG. 2. According to exemplary embodiments, the DPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
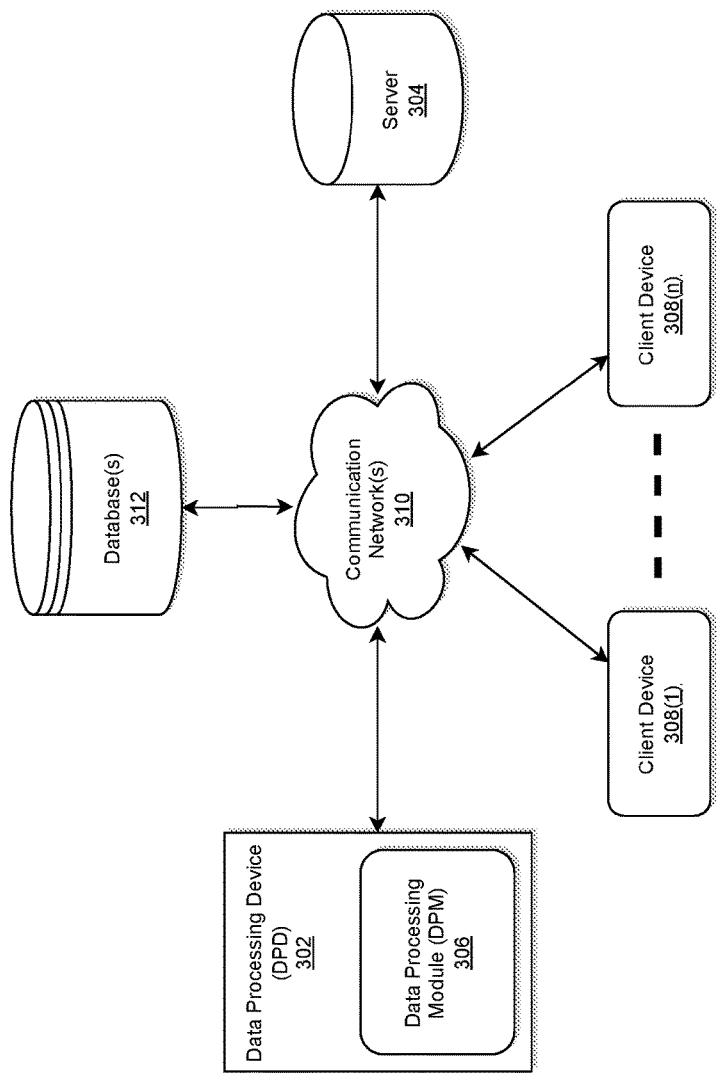
FIG. 3 illustrates a system diagram for implementing a platform, language, database, and cloud agnostic data processing device having a platform, language, database, and cloud agnostic data processing module in accordance with an exemplary embodiment.

FIG. 3 illustrates a system diagram for implementing a platform, language, and cloud agnostic DPD having a platform, language, database, and cloud agnostic data processing module (DPM) in accordance with an exemplary embodiment.

As illustrated in FIG. 3, the system 300 may include an DPD 302 within which an DPM 306 is embedded, a server 304, a database(s) 312, a plurality of client devices 308(1) . . . 308(n), and a communication network 310.

According to exemplary embodiments, the DPD 302 including the DPM 306 may be connected to the server 304, and the database(s) 312 via the communication network 310. The DPD 302 may also be connected to the plurality of client devices 308(1) . . . 308(n) via the communication network 310, but the disclosure is not limited thereto.

According to exemplary embodiment, the DPD 302 is described and shown in FIG. 3 as including the DPM 306, although it may include other rules, policies, modules, databases, or applications, for example. According to exemplary embodiments, the database(s) 312 may be configured to store ready to use modules written for each Application Programming Interface (API) for all environments. Although only one database is illustrated in FIG. 3, the disclosure is not limited thereto. Any number of desired databases may be utilized for use in the disclosed invention herein. The database(s) may be a mainframe database, a log database that may produce programming for searching, monitoring, and analyzing machine-generated data via a web interface, etc., but the disclosure is not limited thereto.

According to exemplary embodiments, the DPM 306 may be configured to receive real-time feed of data from the plurality of client devices 308(1) . . . 308(n) and secondary sources via the communication network 310.

As may be described below, the DPM 306 may be configured to: identify a plurality of data files each having a predefined file format and structure and view corresponding file status, the plurality of data files being received from various data sources; implement a generic single ETL processor for front loading of ETL in a manner such that user input is received to configure the plurality of files and transmit to multiple downstream systems for further processing via UI mapping; implement a user UI platform that includes a configuration UI layer and an upload UI layer; receive user input, via the configuration UI layer, to configure the files and corresponding fields that are to be generated in the multiple downstream systems; receive approval for the files that has been configured; upload, in response to receiving approval, the files via the upload UI layer; monitor the uploaded files; determine that an uploaded file is valid based on matching corresponding configuration details and file rules received from the generic single ETL processor; transmit the valid file to a corresponding downstream system based on received corresponding output configuration and outbound rules; and output a final publication by the downstream system based on receiving the valid file, but the disclosure is not limited thereto.

The plurality of client devices 308(1) . . . 308(n) are illustrated as being in communication with the DPD 302. In this regard, the plurality of client devices 308(1) . . . 308(n) may be "clients" (e.g., customers) of the DPD 302 and are described herein as such. Nevertheless, it is to be known and understood that the plurality of client devices 308(1) . . . 308(n) need not necessarily be "clients" of the DPD 302, or any entity described in association therewith herein. Any additional or alternative relationship may exist between either or both of the plurality of client devices 308(1) . . . 308(n) and the DPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the DPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DPD 302 may be the same or similar to the DPD 202 as described with respect to FIG. 2, including any features or combination of features described with respect thereto.

Figure 4:
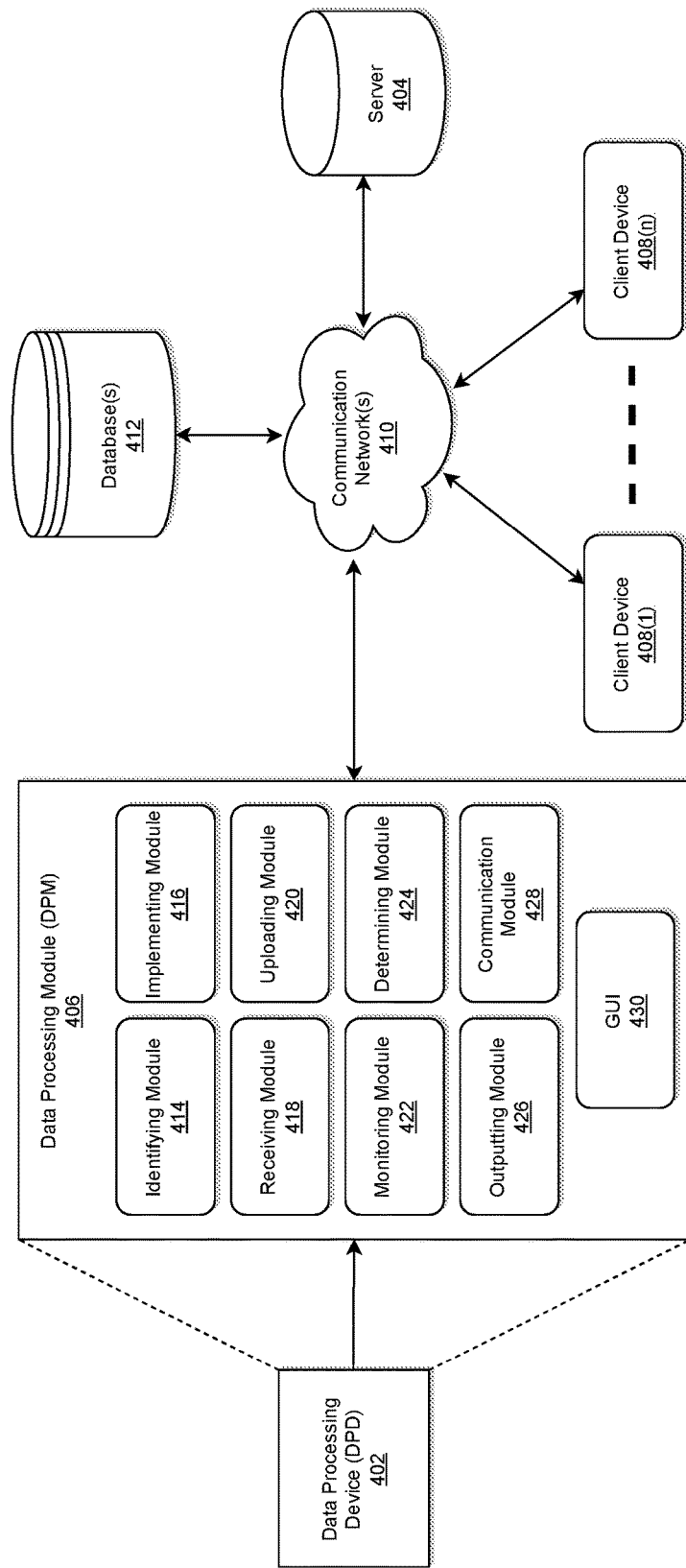
FIG. 4 illustrates a system diagram for implementing a platform, language, database, and cloud agnostic data processing module of FIG. 3 in accordance with an exemplary embodiment.

FIG. 4 illustrates a system diagram for implementing a platform, language, database, and cloud agnostic DPM of FIG. 3 in accordance with an exemplary embodiment.

According to exemplary embodiments, the system 400 may include a platform, language, database, and cloud agnostic DPD 402 within which a platform, language, database, and cloud agnostic DPM 406 is embedded, a server 404, database(s) 412, and a communication network 410. According to exemplary embodiments, server 404 may comprise a plurality of servers located centrally or located in different locations, but the disclosure is not limited thereto.

According to exemplary embodiments, the DPD 402 including the DPM 406 may be connected to the server 404 and the database(s) 412 via the communication network 410. The DPD 402 may also be connected to the plurality of client devices 408(1)-408(n) via the communication network 410, but the disclosure is not limited thereto. The DPM 406, the server 404, the plurality of client devices 408(1)-408(n), the database(s) 412, the communication network 410 as illustrated in FIG. 4 may be the same or similar to the DPM 306, the server 304, the plurality of client devices 308(1)-308(n), the database(s) 312, the communication network 310, respectively, as illustrated in FIG. 3.

According to exemplary embodiments, as illustrated in FIG. 4, the DPM 406 may include an identifying module 414, an implementing module 416, a receiving module 418, an uploading module 420, a monitoring module 422, a determining module 424, an outputting module 426, a communication module 428, and a GUI 430. According to exemplary embodiments, interactions and data exchange among these modules included in the DPM 406 provide the advantageous effects of the disclosed invention. Functionalities of each module of FIG. 4 may be described in detail below with reference to FIGS. 4-6.

According to exemplary embodiments, each of the identifying module 414, implementing module 416, receiving module 418, uploading module 420, monitoring module 422, determining module 424, outputting module 426, and the communication module 428 of the DPM 406 of FIG. 4 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the identifying module 414, implementing module 416, receiving module 418, uploading module 420, monitoring module 422, determining module 424, outputting module 426, and the communication module 428 of the DPM 406 of FIG. 4 may be implemented by microprocessors or similar, and may be programmed using software (e.g., microcode) to perform various functions discussed herein and may optionally be driven by firmware and/or software.

Alternatively, according to exemplary embodiments, each of the identifying module 414, implementing module 416, receiving module 418, uploading module 420, monitoring module 422, determining module 424, outputting module 426, and the communication module 428 of the DPM 406 of FIG. 4 may be implemented by dedicated hardware, or as a combination of dedicated hardware to perform some functions and a processor (e.g., one or more programmed microprocessors and associated circuitry) to perform other functions, but the disclosure is not limited thereto. For example, the DPM 406 of FIG. 4 may also be implemented by Cloud based deployment.

According to exemplary embodiments, each of the identifying module 414, implementing module 416, receiving module 418, uploading module 420, monitoring module 422, determining module 424, outputting module 426, and the communication module 428 of the DPM 406 of FIG. 4 may be called via corresponding API, but the disclosure is not limited thereto. For example, calls may also be made using event based message interfaces in addition to APIs.

According to exemplary embodiments, the process implemented by the DPM 406 may be executed via the communication module 428 and the communication network 410, which may comprise plural networks as described above.

For example, in an exemplary embodiment, the various components of the DPM 406 may communicate with the server 404, and the database(s) 412 via the communication module 428 and the communication network 410 and the results may be displayed onto the GUI 430. Of course, these embodiments are merely exemplary and are not limiting or exhaustive. The database(s) 412 may include the databases included within the private cloud and/or public cloud and the server 404 may include one or more servers within the private cloud and the public cloud.

Figure 5:
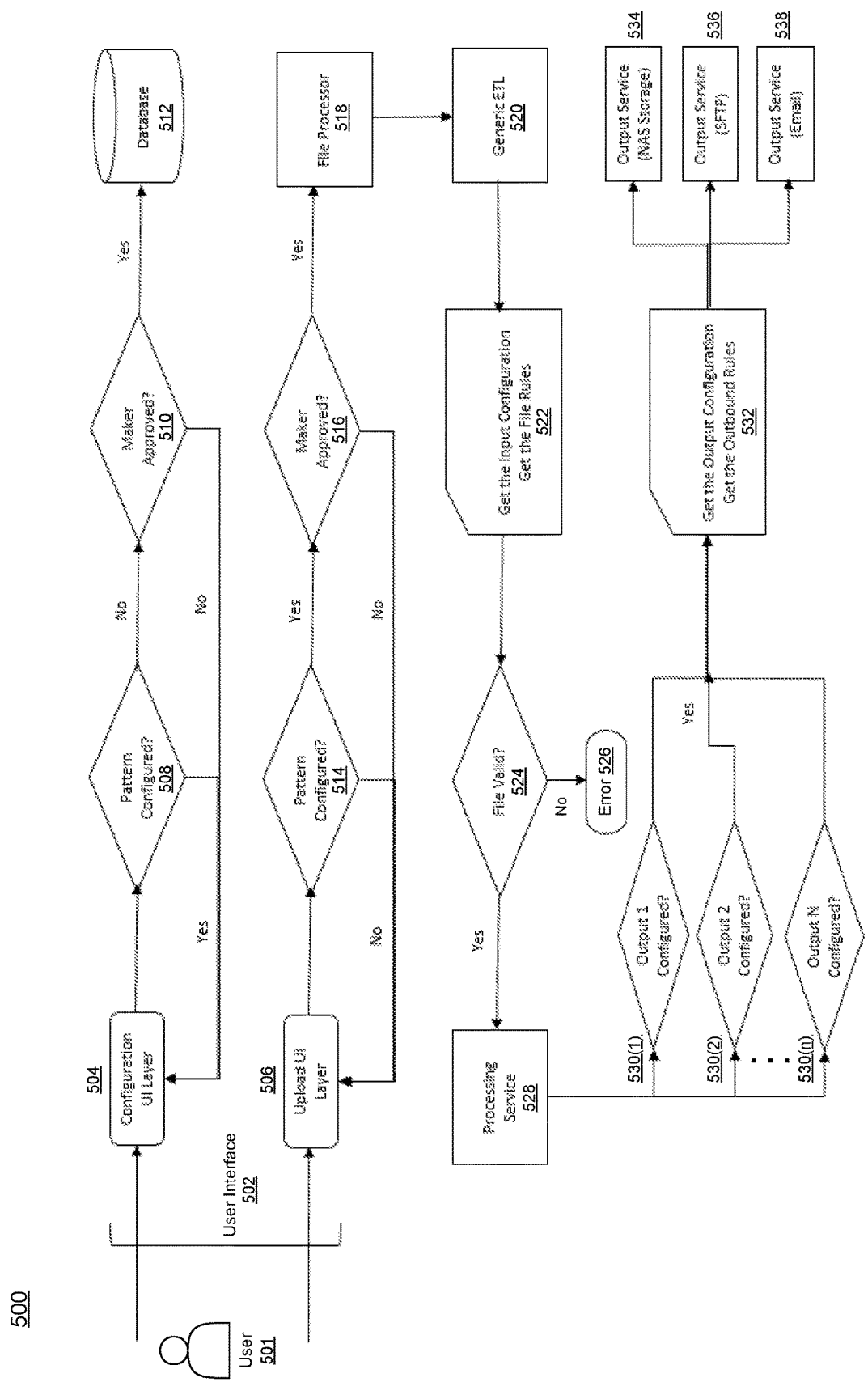
FIG. 5 illustrates an exemplary architecture diagram as implemented by the platform, language, database, and cloud agnostic data processing module of FIG. 4 in accordance with an exemplary embodiment.

FIG. 5 illustrates an exemplary architecture diagram 500 as implemented by the platform, language, database, and cloud agnostic DPM 406 of FIG. 4 for configuring and loading multiple files having different formats and structures which can be extended to unlimited files without any development effort required by a Tech team in accordance with an exemplary embodiment.

Referring back to FIGS. 4 and 5, according to exemplary embodiments, the identifying module 414 may be configured to identify a plurality of data files each having a predefined file format and structure and view corresponding file status, the plurality of data files being received from various data sources (i.e., database(s) 412). The implementing module 416 may be configured to implement a generic single ETL processor (i.e., generic ETL 520 as illustrated in FIG. 5) for front loading of ETL in a manner such that user input from a user 501 is received to configure the plurality of files and transmit to multiple downstream systems for further processing via UI mapping.

According to exemplary embodiments, the implementing module 416 may be further configured to implement a user UI platform (i.e., UI 502) that includes a configuration UI layer 504 and an upload UI layer 506. The UI 502 may include an external data dashboard screen where the user 501 can see and search the plurality of data files that have been submitted and view the file status. The configuration UI layer 504 may include an external data file configuration page which may be utilized by the user 501 to configure the plurality of data files and fields that are to be generated in the outbound systems. In this page the user 501 may also see status of already configured files. The upload UI layer 506 may include an external data file upload screen where the user 501 can upload the plurality of data files being received from various data sources (i.e., database(s) 412) into the system. The user 501 may click on an external data menu that provides access to the relevant screens for user interaction.

According to exemplary embodiments, the receiving module 418 may be configured to receive user input from the user 501, via the configuration UI layer 504, to configure the files and corresponding fields that are to be generated in the multiple downstream systems.

Referring back to FIGS. 4 and 5, at block 508, the determining module 424 of the DPM 406 may determine whether pattern in connection with the files have been configured or not. When it is determined at block 508 that the pattern has not been configured, the process allows the user 501 to utilize the configuration UI layer 504 to configure patterns. When it is determined at block 508 that the pattern has been configured, at block 510, the determining module 424 further determines whether the maker of the pattern has approved this configuration, and if so, the approved configurations are then stored onto the database 512 for future consumption of the configured files. When it is determined at block 510 that the pattern has not been approved by the maker, the process allows the user 501 to configure the files again by utilizing the configuration UI layer 504.

According to exemplary embodiments, after uploading the plurality of files received from the database 512 by utilizing the upload UI layer 506, at block 514, the determining module 424 of the DPM 406 may again determine whether pattern in connection with the files have been configured or not. When it is determined at block 514 that the pattern has not been configured, the process allows the user 501 to utilize the upload UI layer 506 to upload configured patterns. When it is determined at block 514 that the pattern has been configured, at block 516, the determining module 424 further determines whether the maker of the pattern has approved this configuration, and if so, the approved configurations are then transmitted to a file processor 518. When it is determined at block 516 that the pattern has not been approved by the maker, the process allows the user 501 to upload configured files again by utilizing the upload UI layer 506.

According to exemplary embodiments, data from the file processor 518 may be received by the generic ETL 520 block which implements a generic single ETL processor. For example, the DPM 406 may implement the generic single ETL processor for front loading of ETL, i.e., providing flexibility to the user 501 to configure multiple files and transmit to multiple down streams for further processing via UI mapping; and provisioning system to configure new files, restructure old files without any development changes, etc., thereby providing user controlled data loads, reducing tech dependency, providing reusability and scalability, eliminating manual overrides.

For example, referring back to FIGS. 4 and 5, the DPM 406 may receive the input configuration and receive the file rules (i.e., element 522) from the generic ETL 520 block. At block 524, the determining module 424 may determine whether the files are valid or not. When it is determined at block 524 that the files are not valid, error message (i.e., error 526) is displayed onto the GUI 430 for allowing the user 501 to take appropriate remedial actions.

When it is determined at block 524 that the files are valid, the valid files are transmitted to a processing service 528 for further processing for output service 534, 536, 538, etc. For example, at blocks 530(1)-530(n), the determining module 424 may determine that the corresponding output has been configured, the process receives the output configuration and receive that outbound rules (i.e., element 532) for corresponding output service. When it is determined at blocks 530(1)-530(n) that the corresponding output has not been configured, the process allows the user 501 to configure corresponding output.

According to exemplary embodiments, the output service 534 may be a Network-Attached Storage (NAS) which is a file-level computer data storage server connected to a computer network providing data access to a heterogeneous group of clients, but the disclosure is not limited thereto. The term "NAS" can refer to both the technology and systems involved, or a specialized device built for such functionality. The output service 536 may be a Secure File Transfer Protocol (SFTP) which is a network protocol that enables secure and encrypted file transfers between a client and a server, but the disclosure is not limited thereto. The output service 538 may be an electronic mail service, but the disclosure is not limited thereto. According to exemplary embodiments, valid flies can be transmitted to any other desired output service depending on use case.

Referring back to FIGS. 4 and 5, in general, the receiving module 418 may be configured to receive approval for the files that has been configured. The uploading module 420 may be configured to upload, in response to receiving approval, the files via the upload UI layer 506. The monitoring module 422 may be configured to monitor the uploaded files. The determining module 424 may be configured to determine that an uploaded file is valid based on matching corresponding configuration details and file rules received from the generic single ETL processor (i.e., generic ETL 520). The communication module 428 may be configured to transmit the valid file to a corresponding downstream system based on received corresponding output configuration and outbound rules. The outputting module 426 may be configured to output a final publication by the downstream system based on receiving the valid file.

According to exemplary embodiments, the receiving module 418 may be further configured to receive user input to configure the corresponding fields available in the files to consume in a host platform; and redirect the files to any field available in the downstream system based on user selection.

According to exemplary embodiments, the implementing module 416 may be further configured to implement the generic single ETL processor (i.e., generic ETL 520 as illustrated in FIG. 5) for the front loading of ETL in a manner such that components of the single generic ETL processor along with front loading approach can be plugged in any application having similar business requirements.

According to exemplary embodiments, in implementing the front loading approach, the receiving module may be further configured to receive user input via the configuration UI layer 504 to define a predefined file format of each of the plurality of data files; standard nomenclature; and attributes.

According to exemplary embodiments, wherein the predefined file format may include one or more of the following file formats: .pdf, .doc, .csv, .xls, and .xlsx, but the disclosure is not limited thereto.

According to exemplary embodiments, wherein, in a case where the file format may be .xls, the attributes may include indication as to where to start reading, and wherein, in a case where the file format may be .doc, the attributes may include indication of what type of delimiter is utilized. An exemplary table (TABLE 1) is illustrated below for file attributes.

Pattern—(needs to match file name (exclude numbers and symbol)); d. File Type—(select file type from a drop down menu (see TABLE 1 above); e. Start Row No—(this should be the first row data, excluding header column); f. File Load Type—(user 501 should be able to setup the file level via drop down, e.g., user 501 should get options as Fund Level or Share Class to define file load type. File level setup should be excluded from duplicate file validation), etc., but the disclosure is not limited thereto.

According to exemplary embodiments, when inbound file configuration is saved, the file may appear under a workflow history and may provide the following information: a. From Status—indicating current file status; b. To Status—indicating desired file status; c. Updated By—identification of employee/user who uploaded the file; d. Updated Date—date and time the file was uploaded, etc., but the disclosure is not limited thereto. Inbound file mapping should have a standard filed for corresponding client class code.

Once the file has been saved and approved, user 501 can complete inbound field mapping. The display may populate the list of all fields for the selected reporting master. User 501 can update the requisite fields by providing column position: a. Field Index is column position reference in the raw file being loaded (map fields from incoming external data files to predefined fields in the display. Each reporting master has pre-defined universe of fields for each master); b. User 501 may need to update the fields using Index reference, Field Format, User Comments for reference; c. each display field has a pre-defined format for each field (i.e., if the field Format is Date, user 501 would get an option to select the date format (i.e., ddmmyyyy, mmddyyyy, etc.); d. once inbound field mapping is completed and saved, outbound mapping section may be enabled; e. fields user 501 should put reference to in order to get outbound generated; f. client identifier account number should have field to be updated to get translated value of client account code to account number (for this, user 501 may need to map field corresponding to client account number from the raw file), etc., but the disclosure is not limited thereto.

Once inbound file field mapping is completed, next section to select outbound type is enabled. Availability of fields may only be limited to those that have been configured on

TABLE 1

| File Type | File Delimiter | Sheet Name | Start Row No. |
|---|---|---|---|
| TXT | Comma (,), Tilde (~), Pipe (\|), or TAB | N/A | Mandatory Numeric Value |
| CSV | N/A | N/A | Mandatory Numeric Value |
| XLS | N/A | Mandatory Text Value | Mandatory Numeric Value |
| XLSX | N/A | Mandatory Text Value | Mandatory Numeric Value |

According to exemplary embodiments, each of the plurality of data files may belong to a particular reporting master, wherein the reporting master may be a logical grouping of all similar data files having same end usage as a part of financial statements, and wherein the reporting master may be client and financial institution agnostic.

An exemplary user experience in utilizing the DPM 406 is described below.

According to exemplary embodiments, during inbound file configuration, user 501 can configure new file by completing various required fields by utilizing the configuration UI layer 504. Exemplary required fields may include the following: a. Client; b. Reporting Master (select reporting master your file effects from the drop down options); File the file configuration fields. User 501 can select one or all of outbound type as desired based on use case.

According to exemplary embodiments, if user 501 needs to amend an existing file configuration, the user 501 can go to the configuration section, choose the file user 501 wishes to amend by clicking on Edit icon (not shown). Once user 501 clicks on Edit icon, user 501 are automatically brought to an external data configuration detail page. In this page the user 501 can amend all fields Except client and Reporting Master. When all edits are made, user 501 can save changes and submit for approval.

To delete an existing file, the user 501 can go to the configuration section and click on the Edit icon of the file the user 501 wants to delete. On the next page, the user 501 can click on Submit for Deletion icon (not shown) in order to delete the file.

An external data file upload screen may be utilized to upload new external files. Files uploaded here have already been configured once and no longer need configuration.

Figure 6:
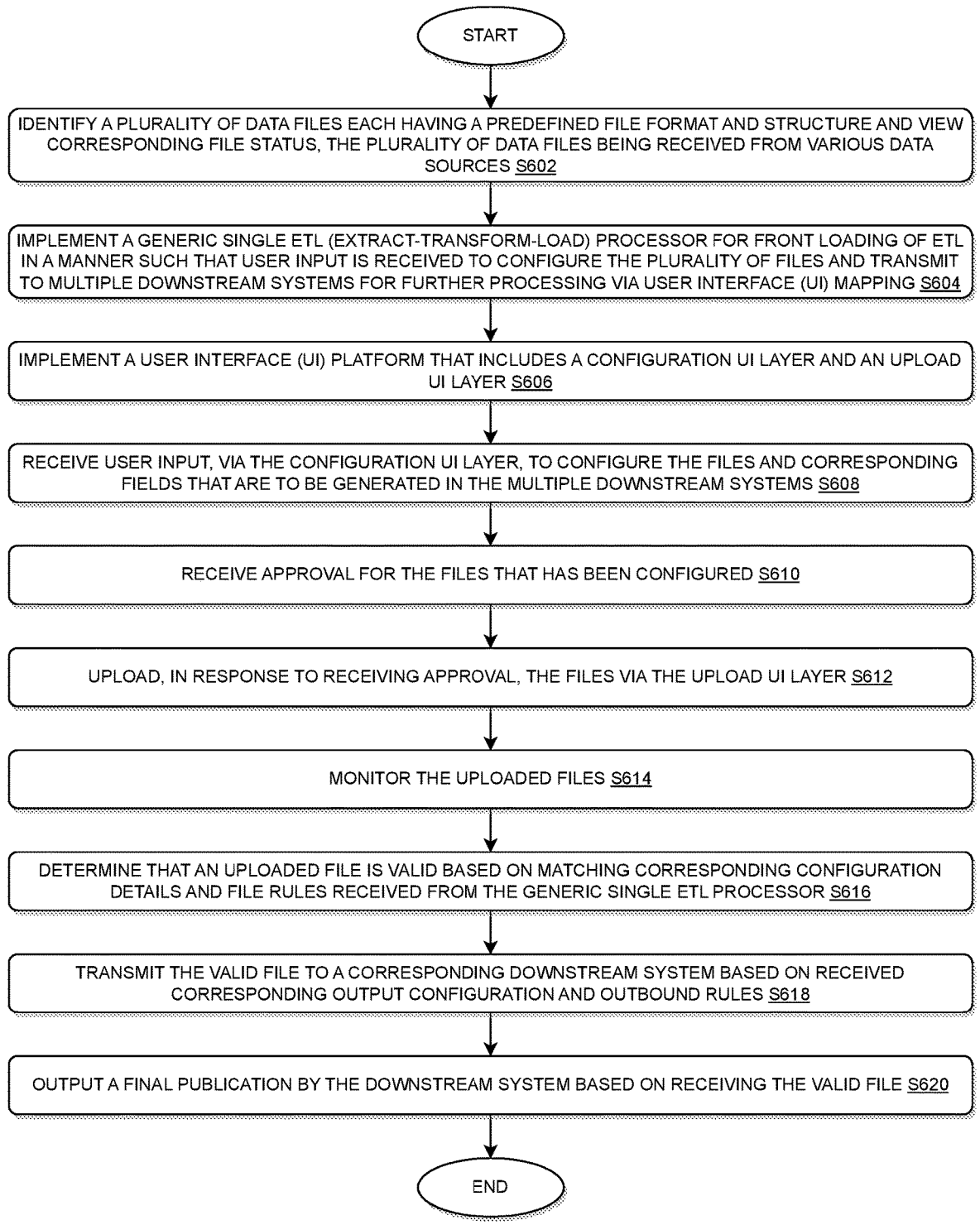
FIG. 6 illustrates an exemplary flow chart of a process implemented by the platform, language, database, and cloud agnostic data processing module of FIG. 4 for implementing a generic single ETL processor for configuring and loading multiple files having different formats and structures in accordance with an exemplary embodiment.

FIG. 6 illustrates an exemplary flow chart of a process 600 implemented by the platform, language, database, and cloud agnostic DPM 406 of FIG. 4 for implementing a generic single ETL processor for configuring and loading multiple files having different formats and structures in accordance with an exemplary embodiment. It may be appreciated that the illustrated process 600 and associated steps may be performed in a different order, with illustrated steps omitted, with additional steps added, or with a combination of reordered, combined, omitted, or additional steps.

As illustrated in FIG. 6, at step S602, the process 600 may include identifying a plurality of data files each having a predefined file format and structure and viewing corresponding file status, the plurality of data files being received from various data sources.

At step S604, the process 600 may include implementing a generic single ETL processor for front loading of ETL in a manner such that user input is received to configure the plurality of files and transmit to multiple downstream systems for further processing via UI mapping.

At step S606, the process 600 may include implementing a UI platform that includes a configuration UI layer and an upload UI layer.

At step S608, the process 600 may include receiving user input, via the configuration UI layer, to configure the files and corresponding fields that are to be generated in the multiple downstream systems.

At step S610, the process 600 may include receiving approval for the files that has been configured.

At step S612, the process 600 may include uploading, in response to receiving approval, the files via the upload UI layer.

At step S614, the process 600 may include monitoring the uploaded files.

At step S616, the process 600 may include determining that an uploaded file is valid based on matching corresponding configuration details and file rules received from the generic single ETL processor.

At step S618, the process 600 may include transmitting the valid file to a corresponding downstream system based on received corresponding output configuration and outbound rules.

At step S620, the process 600 may include outputting a final publication by the downstream system based on receiving the valid file.

According to exemplary embodiments, the process 600 may further include: receiving user input to configure the corresponding fields available in the files to consume in a host platform; and redirecting the files to any field available in the downstream system based on user selection.

According to exemplary embodiments, the process 600 may further include: implementing the generic single ETL processor for the front loading of ETL in a manner such that components of the single generic ETL processor along with front loading approach can be plugged in any application having similar business requirements.

According to exemplary embodiments, in implementing the front loading approach, the process 600 may further include: receiving user input via the configuration UI layer to define: a predefined file format of each of said plurality of data files; standard nomenclature; and attributes.

According to exemplary embodiments, in the process 600, the predefined file format may include one or more of the following file formats: .pdf, .doc, .csv, .xls, and .xlsx, but the disclosure is not limited thereto.

According to exemplary embodiments, in the process 600, in a case where the file format may be .xls, the attributes may include indication as to where to start reading, and in a case where the file format may be .doc, the attributes may include indication of what type of delimiter is utilized.

According to exemplary embodiments, in the process 600, each of the plurality of data files may belong to a particular reporting master, wherein the reporting master may be a logical grouping of all similar data files having same end usage as a part of financial statements, and wherein the reporting master may be client and financial institution agnostic.

According to exemplary embodiments, the DPD 402 may include a memory (e.g., a memory 106 as illustrated in FIG. 1) which may be a non-transitory computer readable medium that may be configured to store instructions for implementing a platform, language, database, and cloud agnostic DPM 406 for implementing a generic single ETL processor for configuring and loading multiple files having different formats and structures as disclosed herein. The DPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DPM 406 or within the DPD 402, may be used to perform one or more of the methods and processes as described herein. In a particular embodiment, the instructions may reside completely, or at least partially, within the memory 106, the medium reader 112, and/or the processor 104 (see FIG. 1) during execution by the DPD 402.

According to exemplary embodiments, the instructions, when executed, may cause a processor embedded within the DPM 406 or the DPD 402 to perform the following: identifying a plurality of data files each having a predefined file format and structure and viewing corresponding file status, the plurality of data files being received from various data sources; implementing a generic single ETL processor for front loading of ETL in a manner such that user input is received to configure the plurality of files and transmit to multiple downstream systems for further processing via UI mapping; implementing a user interface (UI) platform that includes a configuration UI layer and an upload UI layer; receiving user input, via the configuration UI layer, to configure the files and corresponding fields that are to be generated in the multiple downstream systems; receiving approval for the files that has been configured; uploading, in response to receiving approval, the files via the upload UI layer; monitoring the uploaded files; determining that an uploaded file is valid based on matching corresponding configuration details and file rules received from the generic single ETL processor; transmitting the valid file to a corresponding downstream system based on received corresponding output configuration and outbound rules; and outputting a final publication by the downstream system based on receiving the valid file. According to exemplary embodiments, the processor may be the same or similar to the processor 104 as illustrated in FIG. 1 or the processor embedded within the DPD 202, DPD 302, DPD 402, and DPM 406 which is the same or similar to the processor 104.

According to exemplary embodiments, the instructions, when executed, may cause the processor 104 to further perform the following: receiving user input to configure the corresponding fields available in the files to consume in a host platform; and redirecting the files to any field available in the downstream system based on user selection.

According to exemplary embodiments, the instructions, when executed, may cause the processor 104 to further perform the following: implementing the generic single ETL processor for the front loading of ETL in a manner such that components of the single generic ETL processor along with front loading approach can be plugged in any application having similar business requirements.

According to exemplary embodiments, in implementing the front loading approach, the instructions, when executed, may cause the processor 104 to further perform the following: receiving user input via the configuration UI layer to define: a predefined file format of each of said plurality of data files; standard nomenclature; and attributes.

According to exemplary embodiments as disclosed above in FIGS. 1-6, technical improvements effected by the instant disclosure may include a platform for implementing a platform, language, database, and cloud agnostic data processing module for implementing a generic single ETL processor for configuring and loading multiple files having different formats and structures which can be extended to unlimited files without any development effort required by a Tech team, but the disclosure is not limited thereto. For example, according to exemplary embodiments, as disclosed above in FIGS. 1-6, technical improvements effected by the instant disclosure may include a platform for implementing a platform, language, database, and cloud agnostic data processing module for implementing a generic single ETL processor for front loading of ETL, i.e., providing flexibility to users to configure multiple files and transmit to multiple down streams for further processing via User Interface (UI) mapping; provisioning system to configure new files, restructure old files without any development changes, etc., thereby providing user controlled data loads, reducing tech dependency, providing reusability and scalability, eliminating manual overrides, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for processing of multiple files having different formats and structures by utilizing one or more processors and one or more memories, the method comprising:
    implementing a data processing module (DPM) configured to implement a generic single ETL (Extract-Transform-Load) processor for configuring and loading multiple files having different formats and structures which can be extended to a plurality of files, the DPM including an identifying module, an implementing module, a receiving module, an uploading module, a monitoring module, a determining module, an outputting module, and a communication module, wherein each module being called via corresponding application programming interface (API);
    identifying, by calling the identifying module, a plurality of data files each having a predefined file format and structure and viewing corresponding file status, the plurality of data files being received from various data sources;
    implementing, by calling the implementing module, a user interface (UI) platform that includes a configuration UI layer, an upload UI layer, and an external data dashboard screen, wherein the external data dashboard screen receives user input from the user to search the plurality of data files that have been submitted and view file status, wherein the configuration UI layer includes an external data file configuration page which receives user input from the user to configure the plurality of data files and fields that are to be generated in multiple downstream systems and see status of already configured files, wherein the upload UI layer includes an external data file upload screen which receives user input from the user to upload the plurality of data files being received from the various data sources into the multiple downstream systems;
    receiving user input, via the configuration UI layer, to configure the files and corresponding fields that are to be generated in the multiple downstream systems for further processing via UI mapping;
    receiving, by calling the receiving module, approval for the files that has been configured;
    uploading, in response to receiving approval, the files via the upload UI layer by calling the uploading module;
    monitoring the uploaded files by calling the monitoring module;
    determining, by calling the determining module, that an uploaded file is valid based on matching corresponding configuration details and file rules received from the generic single ETL processor;
    transmitting, by calling the communication module, the valid file to a corresponding downstream system based on received corresponding output configuration and outbound rules;
    outputting, by calling the outputting module, a final publication by the downstream system based on receiving the valid file;
    implementing, by calling the implementing module, the generic single ETL processor for the front loading of ETL; and
    plugging components of the generic single ETL processor along with front loading approach to an application in the downstream system.

2. The method according to claim 1, further comprising:
    receiving user input to configure the corresponding fields available in the files to consume in a host platform; and
    redirecting the files to any field available in the downstream system based on user selection.

3. The method according to claim 1, wherein in implementing the front loading approach, the method further comprising:
    receiving user input via the configuration UI layer to define: a predefined file format of each of said plurality of data files; standard nomenclature; and attributes.

4. The method according to claim 3, wherein the predefined file format includes one or more of the following file formats: .pdf, .doc, .csv, .xls, and .xlsx.

5. The method according to claim 4, wherein, in a case where the predefined file format is .xls, the attributes include indication as to where to start reading, and
    wherein, in a case where the predefined file format is .doc, the attributes include indication of what type of delimiter is utilized.

6. The method according to claim 1, wherein each of said plurality of data files belongs to a particular reporting master, wherein the reporting master is a logical grouping of all similar data files having same end usage as a part of financial statements, and wherein the reporting master is client and financial institution agnostic.

7. A system for processing of multiple files having different formats and structures, the system comprising:
    a processor; and
    a memory operatively connected to the processor via a communication interface, the memory storing computer readable instructions, when executed, causes the processor to:
    implement a data processing module (DPM) configured to implement a generic single ETL (Extract-Transform-Load) processor for configuring and loading multiple files having different formats and structures which can be extended to a plurality of files, the DPM including an identifying module, an implementing module, a receiving module, an uploading module, a monitoring module, a determining module, an outputting module, and a communication module, wherein each module being called via corresponding application programming interface (API);
    identify, by calling the identifying module, a plurality of data files each having a predefined file format and structure and viewing corresponding file status, the plurality of data files being received from various data sources;

implement, by calling the implementing module, a user interface (UI) platform that includes a configuration UI layer, an upload UI layer, and an external data dashboard screen, wherein the external data dashboard screen receives user input from the user to search the plurality of data files that have been submitted and view file status, wherein the configuration UI layer includes an external data file configuration page which receives user input from the user to configure the plurality of data files and fields that are to be generated in multiple downstream systems and see status of already configured files, wherein the upload UI layer includes an external data file upload screen which receives user input from the user to upload the plurality of data files being received from the various data sources into the multiple downstream systems;

receive user input, via the configuration UI layer, to configure the files and corresponding fields that are to be generated in the multiple downstream systems for further processing via UI mapping;

receive, by calling the receiving module, approval for the files that has been configured;

upload, in response to receiving approval, the files via the upload UI layer by calling the uploading module;

monitor the uploaded files by calling the monitoring module;

determine, by calling the determining module, that an uploaded file is valid based on matching corresponding configuration details and file rules received from the generic single ETL processor;

transmit, by calling the communication module, the valid file to a corresponding downstream system based on received corresponding output configuration and outbound rules;

output, by calling the outputting module, a final publication by the downstream system based on receiving the valid file;

implement, by calling the implementing module, the generic single ETL processor for the front loading of ETL; and plug components of the generic single ETL processor along with front loading approach to an application in the downstream system.

8. The system according to claim 7, wherein the processor is further configured to:
receive user input to configure the corresponding fields available in the files to consume in a host platform; and
redirect the files to any field available in the downstream system based on user selection.

9. The system according to claim 7, in implementing the front loading approach, the processor is further configured to:
receive user input via the configuration UI layer to define: a predefined file format of each of said plurality of data files; standard nomenclature; and attributes.

10. The system according to claim 9, wherein the predefined file format includes one or more of the following file formats: .pdf, .doc, .csv, .xls, and .xlsx.

11. The system according to claim 10, wherein, in a case where the predefined file format is .xls, the attributes include indication as to where to start reading, and
wherein, in a case where the predefined file format is .doc, the attributes include indication of what type of delimiter is utilized.

12. The system according to claim 7, wherein each of said plurality of data files belongs to a particular reporting master, wherein the reporting master is a logical grouping of all similar data files having same end usage as a part of financial statements, and wherein the reporting master is client and financial institution agnostic.

13. A non-transitory computer readable medium configured to store instructions for processing of multiple files having different formats and structures, the instructions, when executed, cause a processor to perform the following:

implementing a data processing module (DPM) configured to implement a generic single ETL (Extract-Transform-Load) processor for configuring and loading multiple files having different formats and structures which can be extended to a plurality of files, the DPM including an identifying module, an implementing module, a receiving module, an uploading module, a monitoring module, a determining module, an outputting module, and a communication module, wherein each module being called via corresponding application programming interface (API);

identifying, by calling the identifying module, a plurality of data files each having a predefined file format and structure and viewing corresponding file status, the plurality of data files being received from various data sources;

implementing, by calling the implementing module, a user interface (UI) platform that includes a configuration UI layer, an upload UI layer, and an external data dashboard screen, wherein the external data dashboard screen receives user input from the user to search the plurality of data files that have been submitted and view file status, wherein the configuration UI layer includes an external data file configuration page which receives user input from the user to configure the plurality of data files and fields that are to be generated in multiple downstream systems and see status of already configured files, wherein the upload UI layer includes an external data file upload screen which receives user input from the user to upload the plurality of data files being received from the various data sources into the multiple downstream systems;

receiving user input, via the configuration UI layer, to configure the files and corresponding fields that are to be generated in the multiple downstream systems for further processing via UI mapping;

receiving, by calling the receiving module, approval for the files that has been configured;

uploading, in response to receiving approval, the files via the upload UI layer by calling the uploading module;

monitoring the uploaded files by calling the monitoring module;

determining, by calling the determining module, that an uploaded file is valid based on matching corresponding configuration details and file rules received from the generic single ETL processor;

transmitting, by calling the communication module, the valid file to a corresponding downstream system based on received corresponding output configuration and outbound rules;

outputting, by calling the outputting module, a final publication by the downstream system based on receiving the valid file;

implementing, by calling the implementing module, the generic single ETL processor for the front loading of ETL; and plugging components of the generic single ETL processor along with front loading approach to an application in the downstream system.

14. The non-transitory computer readable medium according to claim 13, wherein the instructions, when executed, cause the processor to further perform the following:

receiving user input to configure the corresponding fields available in the files to consume in a host platform; and redirecting the files to any field available in the downstream system based on user selection.

15. The non-transitory computer readable medium according to claim 13, in implementing the front loading approach, the instructions, when executed, cause the processor to further perform the following:

receiving user input via the configuration UI layer to define: a predefined file format of each of said plurality of data files; standard nomenclature; and attributes.

16. The non-transitory computer readable medium according to claim 15, wherein the predefined file format includes one or more of the following file formats: .pdf, .doc, .csv, .xls, and .xlsx.

17. The non-transitory computer readable medium according to claim 16, wherein, in a case where the predefined file format is .xls, the attributes include indication as to where to start reading, and wherein, in a case where the predefined file format is .doc, the attributes include indication of what type of delimiter is utilized.

* * * * *